US011202108B2

(12) United States Patent
Whitton et al.

(10) Patent No.: US 11,202,108 B2
(45) Date of Patent: Dec. 14, 2021

(54) AUGMENTING DYNAMIC AD INSERTION INVENTORY WITH UNUSED INVENTORY

(71) Applicant: Charter Communications Operating, LLC, St. Louis, MO (US)

(72) Inventors: Tim Whitton, Aurora, CO (US); Glenn K. Meyer, St. Louis, MO (US); Basil Badawiyeh, St. Louis, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 217 days.

(21) Appl. No.: 16/113,806

(22) Filed: Aug. 27, 2018

(65) Prior Publication Data

US 2020/0068236 A1    Feb. 27, 2020

(51) Int. Cl.
*H04N 21/234* (2011.01)
*G06Q 30/02* (2012.01)
*H04N 21/81* (2011.01)
*H04L 29/06* (2006.01)

(52) U.S. Cl.
CPC ... *H04N 21/23424* (2013.01); *G06Q 30/0242* (2013.01); *H04L 65/4084* (2013.01); *H04N 21/812* (2013.01)

(58) Field of Classification Search
CPC .......... H04N 21/23424; H04N 21/812; G06Q 30/0242; H04L 65/4084

USPC ................ 705/14.41, 14.69, 14.45
See application file for complete search history.

(56) References Cited

U.S. PATENT DOCUMENTS

| | | | |
|---|---|---|---|
| 9,313,536 B1* | 4/2016 | Killick | H04N 21/812 |
| 2009/0144129 A1* | 6/2009 | Grout | G06Q 30/0283 |
| | | | 705/14.42 |
| 2014/0040019 A1* | 2/2014 | Zheng | G06Q 30/0246 |
| | | | 705/14.45 |
| 2019/0215556 A1* | 7/2019 | Nugent | H04N 21/26258 |

FOREIGN PATENT DOCUMENTS

WO    WO-9716038 A1 *  5/1997  ............ H04M 15/58

OTHER PUBLICATIONS

Erin Smith, What is Dynamic Ad Insertion?, 2017 (Year: 2017).*

* cited by examiner

*Primary Examiner* — Tarek Elchanti
(74) *Attorney, Agent, or Firm* — The Marbury Law Group, PLLC

(57) ABSTRACT

Systems, methods, and devices of the various embodiments may provide for dynamic ad insertion. Systems, methods, and devices of the various embodiments may enable Video-On-Demand (VOD) dynamic ad inventory handling by a network operator. Systems, methods, and devices of the various embodiments may enable augmenting network operator VOD ad inventory in a VOD session.

15 Claims, 10 Drawing Sheets

AUGMENTING DYNAMIC AD INSERTION INVENTORY WITH UNUSED INVENTORY

BACKGROUND

In conventional Video-On-Demand (VOD) systems, a network operator, such as a cable company, a multiple-system operator (MSO), etc., utilizes its network infrastructure to stream VOD content to computing devices of users as the users request to view the VOD content. In conventional VOD systems, the VOD content typically has one or more ad opportunities within it at which advertisements can be inserted into the VOD content for output to the users while the users are watching the VOD content. In conventional VOD systems, the one or more ad opportunities can represent advertising inventory.

In conventional VOD systems, typical control of the advertising inventory is split between the programmer who is provisioning the VOD content to the network operator and the network operator (e.g., a MSO). For example, a programmer can control eighty five percent of the advertising inventory as programmer inventory and the network operator can control fifteen percent of the advertising inventory as operator inventory. While programmers and network operators both control advertising inventory for the same VOD content, in conventional VOD systems programmer inventory is not made available for use by network operators. For example, in conventional VOD systems, if the programmer cannot sell all its portion of the advertising inventory, there is no way for programmers to send this unsold inventory to the network operator. The inability for network operators to utilize programmer inventory in current VOD systems results in lost advertising opportunities when programmers do not fully utilize all of their allotted ad opportunities in VOD content.

Additional, in conventional VOD systems, ad request messages, such as Video Ad Serving Template (VAST) requests according to the Interactive Advertising Bureau's (IAB's) Digital Video Committee's VAST Protocol (VAST protocol), placement requests according to the Digital Program Insertion—Advertising Systems Interfaces Protocol of the American National Standards Institute (ANSI)/Society of Cable Telecommunications Engineers (SCTE) 130 part 3 (SCTE 130 protocol), etc., and ad response messages, such as VAST responses according to the VAST protocol, placement responses according to the SCTE 130 protocol, etc., do not themselves indicate whether programmers or network operators control (i.e., own) placement opportunities associated with the messages. The lack of indication as to whether programmers or network operators control (i.e., own) placement opportunities associated with ad request messages and ad response messages in conventional VOD systems can prevent ad placement opportunities that a programmer does not fill from being filled by a network operator.

SUMMARY

Systems, methods, and devices of the various embodiments disclosed herein may provide for on-demand dynamic ad insertion. Systems, methods, and devices of the various embodiments may enable Video-On-Demand (VOD) dynamic ad inventory handling by a network operator. Systems, methods, and devices of the various embodiments may enable augmenting network operator VOD ad inventory in a VOD session. In various embodiments, ad request messages, such as Video Ad Serving Template (VAST) requests according to the Interactive Advertising Bureau's (IAB's) Digital Video Committee's VAST Protocol (VAST protocol), placement requests according to the Digital Program Insertion—Advertising Systems Interfaces Protocol of the American National Standards Institute (ANSI)/Society of Cable Telecommunications Engineers (SCTE) 130 part 3 (SCTE 130 protocol), etc., and ad response messages, such as VAST responses according to the VAST protocol, placement responses according to the SCTE 130 protocol, etc., may indicate whether programmers or network operators control (i.e., own) placement opportunities associated with the messages. The various embodiments may provide the ability to indicate whether programmers or network operators control (i.e., own) placement opportunities associated with ad request messages and ad response messages, thereby enabling ad placement opportunities that a programmer does not fill to be filled by a network operator.

Various embodiments may include a method for ad inventory, such as VOD ad inventory, handling. The method may be implemented by a server, such as a server of a network operator (e.g., an inventory optimization server). The method may include generating one or more ad inventory rules based on one or more inventory handling definitions, receiving a rules request message for a video session, such as a VOD session, from an ad router server, generating a rules response message for the video session, the rules response message indicating at least one of the generated one or more ad inventory rules, and sending the rules response message for the video session to the ad router server. The generated one or more ad inventory rules may include rights definitions for the ad inventory to direct how one or more Ad Decision Services (ADSs) assign ads.

Various embodiments may include a method for augmenting network operator ad inventory, such as VOD ad inventory. The method may be implemented by an ad router server. The method may include determining whether an ad response message from a programmer server indicates any unused programmer ad inventory is available for a video session, such as a VOD session, generating an ad request message to a network operator server in response to the ad response message from the programmer server indicating unused programmer ad inventory is available for the video session, the ad request message indicating both pre-assigned network operator ad inventory and the unused programmer ad inventory, and sending the ad request message to the network operator server.

Various embodiments may include a method for augmenting network operator ad inventory, such as VOD ad inventory. The method may be implemented by network operator server, such as a network operator ADS (e.g., multiple-system operator (MSO) ADS), network operator ad server, etc. The method may include receiving an ad request message from an ad router server, the ad request message indicating both pre-assigned network operator ad inventory and unused programmer ad inventory, generating an ad response message indicating at least one ad identifier assigned to the unused programmer ad inventory, and sending the ad response message to the ad router server.

Further embodiments disclosed herein include a computing device having a processor configured with processor-executable instructions to perform operations of the methods summarized above. Further embodiments disclosed herein include a computing device including means for performing functions of the methods summarized above. Further embodiments disclosed herein include a non-transitory processor-readable storage medium having stored thereon processor-executable instructions configured to cause a computing device processor to perform operations of the methods summarized above. Further embodiments disclosed herein include a server configured with processor executable instructions to perform operations of the methods summarized above. Further embodiments disclosed herein include a server including means for performing functions of the methods summarized above. Further embodiments disclosed herein include a non-transitory processor-readable storage medium having stored thereon processor-executable instructions configured to cause a server processor to perform operations o of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
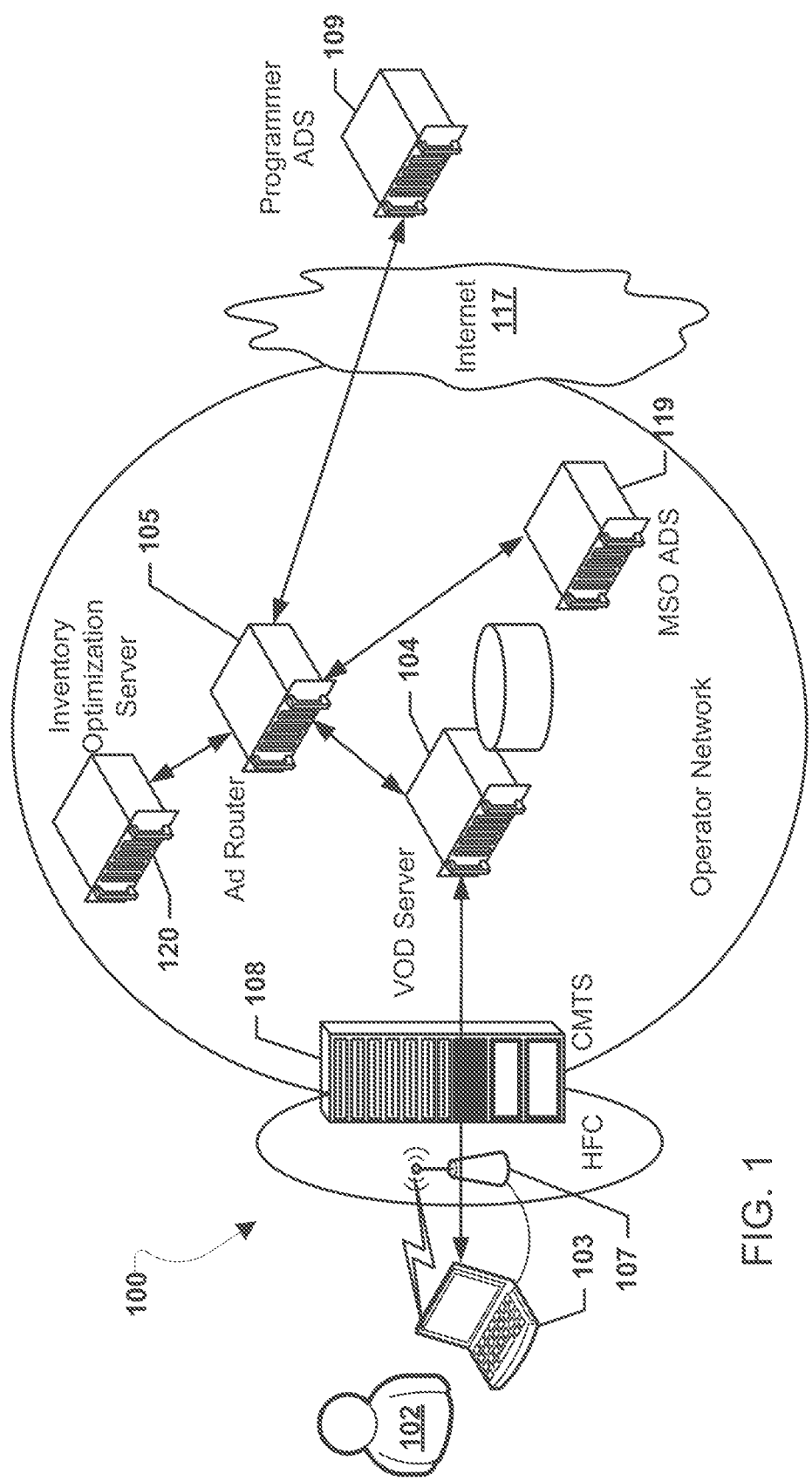
FIG. 1 is a system block diagram of a Video-On-Demand (VOD) system according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computing device" is used to refer to any one or all of satellite or cable set top boxes, laptop computers, rack mounted computers, routers, cellular telephones, smart phones, personal or mobile multi-media players, personal data assistants (PDAs), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

Systems, methods, and devices of the various embodiments may provide for dynamic ad insertion. Systems, methods, and devices of the various embodiments may enable Video-On-Demand (VOD) dynamic ad inventory handling by a network operator. Systems, methods, and devices of the various embodiments may enable augmenting network operator VOD ad inventory in a VOD session. The various embodiments may enable VOD ad placement opportunities in a VOD session that a programmer may not fill (i.e., unused ad opportunities) to be transferred to a network operator (e.g., a multiple-system operator (MSO)). In various embodiments, an ad request message, such as a Video Ad Serving Template (VAST) request according to the Interactive Advertising Bureau's (IAB's) Digital Video Committee's VAST Protocol (VAST protocol), a placement request according to the Digital Program Insertion—Advertising Systems Interfaces Protocol of the American National Standards Institute (ANSI)/Society of Cable Telecommunications Engineers (SCTE) 130 part 3 (SCTE 130 protocol), etc., from an ad router of a network operator may indicate those transferred VOD ad placement opportunities that a programmer may not fill (i.e., unused ad opportunities) to a network operator server, such as a network operator Ad Decision Service (ADS) (e.g., MSO ADS), network operator ad server, etc. In various embodiments, the network operator server may fill such transferred VOD ad placement opportunities with ads selected by the network operator server. The various embodiments may enable network operators to meet the needs of advertising suppliers and buyers that may have ad inventory that is being wasted, such as due to a lack of advertising demand, shortages due to high demand, etc. Additionally, the various embodiments may enable network operators to place regional ads into otherwise national VOD ad placement opportunities that a programmer may not fill (i.e., unused ad opportunities). In this manner, the various embodiments may increase the regional focus of advertising.

Various embodiments may enable advertising inventory buyers and sellers to transact and exchange inventory while eliminating dependencies on dedicated inventory exchange systems established between the advertising inventory buyers and sellers. Various embodiments may provide for the use of programmer inventory by the network operator (e.g., MSO) without contractual commitment by either the programmer or network for the delivery or use of that inventory. Various embodiments may enable the use of programmer inventory by the network operator (e.g., MSO) regardless of a campaign management/decision service in use by the programmer or network operator. Various embodiments may provide for the use of programmer inventory by the operator without the need for mutual membership in a third-party inventory exchange. In various embodiments, VOD ad placement opportunities that a programmer may not fill (i.e., unused ad opportunities) may be identified at the edge of VOD session provisioning, potentially at the last possible moment that an opportunity can be leveraged. As VOD ad placement opportunities that a programmer may not fill (i.e., unused ad opportunities) may be wasted if not used, the various embodiments enabling the use of such unused ad opportunities may justify lower commercial rates for the inventory. In various embodiments, the use of VOD ad placement opportunities that a programmer may not fill (i.e., unused ad opportunities) by a network operator (e.g., a MSO) may be secondary to the use of the network operator's owned inventory. Various embodiments may enable the forecasting of unused inventory using historical analysis of unused inventory volumes.

Various embodiments may provide an ad router server of a network operator that may be configured to enable augmenting network operator VOD ad inventory in a VOD session. In various embodiments, when a session qualifies for unused inventory use, the ad router server may delay the delivery of an ad request message, such as a VAST request, a placement request, etc., until an ad response message, such as a VAST response message, a placement response, etc., has been received from a programmer server, such as a programmer ADS, programmer ad server, etc., and unused inventory identified. The ad router server may then include both owned inventory and unused inventory in the same ad request message, such as a VAST request, a placement request, etc., sent to a network operator server, such as a network operator ADS (e.g., MSO ADS), network operator ad server, etc. In various embodiments, an ad router server may enable consolidating network owned (e.g., MSO owned) opportunities with unused opportunities into a single ad request message, such as a VAST request, a placement request, etc., for a VOD break and/or VOD session. In various embodiments, an ad router server may tag unused inventory opportunities within the ad request message, such as a VAST request, a placement request, etc., to designate the opportunities as unused inventory opportunities. In this manner, owned opportunities may be distinguished from unused inventory opportunities by a network server, such as a network operator ADS (e.g., MSO ADS), network operator ad server, etc. The ability to distinguish owned opportunities from unused inventory opportunities may support the use of owned inventory by a network server, such as a network operator ADS (e.g., MSO ADS), network operator ad server, etc., before making placements within unused inventory.

In various embodiments, an ad router server may determine whether an ad response message from a programmer server, such as a programmer ADS, programmer ad server, etc., indicates any unused programmer ad inventory is available for a VOD session. In response to the ad response message from the programmer server indicating unused programmer ad inventory is available for the VOD session, the ad router server may generate and send an ad request message to a network operator server, such as a network operator ADS (e.g., MSO ADS), network operator ad server, etc., indicating both pre-assigned network operator ad inventory (i.e., owned opportunities of the network operator) and the unused programmer ad inventory (i.e., transferred VOD ad placement opportunities that the programmer did not fill). In various embodiments, the ad request message may be a VAST request according to the VAST protocol, a placement request according to the SCTE 130 protocol, etc. In various embodiments, the ad request message may delineate any pre-assigned network operator ad inventory (i.e., owned opportunities of the network operator) separately from any unused programmer ad inventory (i.e., transferred VOD ad placement opportunities that the programmer did not fill). In various embodiments, the ad request message may identify the unused programmer ad inventory (i.e., transferred VOD ad placement opportunities that the programmer did not fill), such as by network, opportunity type, mid-roll number, and ad type.

In various embodiments, an ad router server may request unused inventory rules from an inventory optimization server of a network operator. In various embodiments, an inventory optimization server of a network operator may enable definition on a per network operator and/or per programmer basis of a network operator's rights to use unused inventory (i.e., transferred VOD ad placement opportunities that the programmer may not fill). In various embodiments, such ad inventory rules may be based on one or more inventory handling definitions provided to the inventory optimization server by programmers and/or network operators. In various embodiments, ad inventory rules may include various limits on how unused inventory (i.e., transferred VOD ad placement opportunities that the programmer may not fill) may be handled. Such limits may include opportunity type limits (e.g., limiting transfer to pre-roll, mid-roll, and/or post-roll type ads, limiting transfer within mid-roll by mid-roll number, etc.), ad type limits (e.g., limiting transfer to paid ads and/or promo ads, etc.), programmer limits (e.g., limiting transfer to a certain number of times per programmer, etc.), network limits (e.g., limiting transfer to a certain number of times per network operator), session limits (e.g., limiting transfer to a maximum number of transfers per VOD session, etc.), time period limits (e.g., limiting transfer to a maximum number of transfers per day, week, month, year, etc.), break limits (e.g., limiting transfer to a maximum number of transfers per break period, etc.), content type limits (e.g., limiting transfer based on the type of content being served in the VOD session, etc.), combinations of those limits (e.g., limits by opportunity type and ad type, etc.), and/or any other type limits applicable to VOD ad placement. In various embodiments, ad inventory rules may include rights definitions for the ad inventory to direct how one or more ADSs assign ads. In various embodiments, an inventory optimization server of a network operator may communicate rules response messages to an ad router server of the network operator in response to a rules request message from the ad router server. The rules response message may indicate unused inventory rights and inventory limits to the ad router server. In various embodiments, the rules response message may indicate that a programmer providing content for a VOD session allows for transfer of unused ad inventory for that VOD session.

In various embodiments, the ad router server may communicate ad metrics, such as harvest metrics, to an inventory optimization server of the network operator. Ad metrics, such as harvest metrics, may include the programmer, network, date, time, session, break number, break sequence, and placed ad identifier (when placement occurs) for each unused programmer ad inventory (i.e., transferred VOD ad placement opportunities that the programmer did not fill) supplied to the network operator server, such as a network operator ADS (e.g., MSO ADS), network operator ad server, etc., in an ad request message. In various embodiments, an inventory optimization server of the network operator may evaluate time-based inventory limits based on the received ad metrics and may update ad inventory rules based at least in part on the received ad metrics. In various embodiments, an inventory optimization server of the network operator may forecast ad inventory levels based on the received ad metrics. In various embodiments, forecasting ad inventory levels may be at various confidence levels based on a length of time the ad metrics may cover. For example, longer duration coverage by ad metrics may result in higher confidence levels.

In various embodiments, a network operator server, such as a network operator ADS (e.g., MSO ADS), network operator ad server, etc., may receive an ad request message from an ad router server indicating both pre-assigned network operator ad inventory and unused programmer ad inventory. In various embodiments, the selection of ads to fill in owned (i.e., pre-assigned) and/or unassigned (i.e., transferred VOD ad placement opportunities that the programmer did not fill) inventory may be handled by a decision service running on a processor of the network operator server. In various embodiments, the ad request message may be a VAST request according to the VAST protocol, a placement request according to the SCTE 130 protocol, etc. The network operator server, such as a network operator ADS (e.g., MSO ADS), network operator ad server, etc., may be configured to distinguish between owned and transferred unused opportunities. In some embodiments, the network operator ADS (e.g., MSO ADS), network operator ad server, etc., may preferential place ads into the owned opportunities over unused opportunities. For example, the use of unused opportunities may be restricted to placements from ad campaigns which are behind plan by a selected percentage. The selected percentage may be a parameter set for each campaign individually. In various embodiments, the option to select ads to fill in owned (i.e., pre-assigned) and/or unassigned (i.e., transferred VOD ad placement opportunities that the programmer did not fill) inventory may be controlled by a campaign manager service running on a processor of the network operator server. The campaign manager service may enable or disable the use of unassigned (i.e., transferred VOD ad placement opportunities that the programmer did not fill) inventory for an advertising campaign. For example, the campaign manager service may configure an advertising campaign such that the use of unassigned (i.e., transferred VOD ad placement opportunities that the programmer did not fill) is allowed or not allowed for a specific campaign.

In various embodiments, an ad router server may be configured to offer unused network operator ad inventory to a programmer for use by the programmer in providing additional ads. In various embodiments, an ad router server may determine whether an ad response message from a network operator server, such as a MSO ADS, network operator ad server, etc., indicates any unused network operator ad inventory (e.g., unused pre-assigned network operator ad inventory that the network operator did not fill) is available for a VOD session. In response to the ad response message from the network operator server (e.g., network operator ADS, MSO ADS, etc.) indicating unused network operator ad inventory is available for the VOD session, the ad router server may generate and send an ad request message to a programmer server, such as a programmer ADS, programmer ad server, etc., indicating the unused network operator ad inventory (i.e., transferred VOD ad placement opportunities that the network operator did not fill). In various embodiments, the ad request message may be a VAST request according to the VAST protocol, a placement request according to the SCTE 130 protocol, etc. In various embodiments, the ad request message may delineate any pre-assigned programmer ad inventory (i.e., owned opportunities of the programmer) separately from any unused network operator ad inventory (i.e., transferred VOD ad placement opportunities that the network operator did not fill). In various embodiments, the ad request message may identify the unused network operator ad inventory (i.e., transferred VOD ad placement opportunities that the network operator did not fill), such as by network, opportunity type, mid-roll number, and ad type.

In various embodiments, a programmer server, such as a programmer ADS, programmer ad server, etc., may receive an ad request message from an ad router server indicating one or both of pre-assigned programmer ad inventory and unused network operator ad inventory. In various embodiments, the selection of ads to fill in owned (i.e., pre-assigned) and/or unassigned (i.e., transferred VOD ad placement opportunities that the network operator did not fill) inventory may be handled by a decision service running on a processor of the programmer server (e.g., programmer ADS, etc.). In various embodiments, the ad request message may be a VAST request according to the VAST protocol, a placement request according to the SCTE 130 protocol, etc. The programmer server, such as a programmer ADS, programmer ad server, etc., may be configured to distinguish between owned and transferred unused opportunities.

Various embodiments may provide a technical solution to the technical problem in conventional VOD systems that ad request messages, such as VAST requests according to the VAST protocol, placement requests according to the SCTE 130 protocol, etc., and ad response messages, such as VAST responses according to the VAST protocol, placement requests according to the SCTE 130 protocol, etc., cannot indicate whether programmers or network operators control (i.e., own) placement opportunities associated with the messages. Various embodiments may provide the technical solution, at least in part, by enabling both owned inventory and unused inventory to be delineated in the same ad request messages, such as VAST requests according to the VAST protocol, placement requests according to the SCTE 130 protocol, etc., and/or ad response messages, such as VAST responses according to the VAST protocol, placement requests according to the SCTE 130 protocol, etc. Various embodiment may provide a technical solution that may eliminate a need for a dedicated ad inventory exchange system to be constructed between programmers and network operators. Various embodiments may provide the technical solution, at least in part, by enabling ad router servers to support transferring VOD ad placement opportunities in a VOD session that a programmer may not fill (i.e., unused ad opportunities) to a network operator (e.g., a multiple-system operator (MSO)) without the use of a dedicated ad inventory exchange system. Various embodiments may provide a technical solution that holds or delays generation and sending of an ad request message, such as a VAST request, a placement request, etc., to a network operator server, such as a network operator ADS (e.g., MSO ADS), network operator ad server, etc., until after an ad request message, such as a VAST request, a placement request, etc., to a programmer server, such as a programmer ADS, etc., has been responded to by the programmer server. Various embodiments may improve the functioning of VOD systems by enabling VOD ad placement opportunities that a programmer may not fill (i.e., unused ad opportunities) to be identified while the VOD session is actually being provisioned (e.g., after a VOD server requests ads for a VOD session initiated by a user's computing device). For example, the various embodiments may enable VOD ad placement opportunities that a programmer may not fill (i.e., unused ad opportunities) to be identified at the edge of VOD session provisioning at the time at which the programmer actually returned an ad response message, such as a VAST response according to the VAST protocol, a placement request according to the SCTE 130 protocol, etc., indicating the programmer did not fill all of its VOD ad placement opportunities. Such last moment identification provided by the various embodiments may enable network operators to fill those unused ad opportunities, thereby preventing the VOD session from including a gap where an ad break was not fully filled.

Various examples of video sessions are discussed herein, such as VOD sessions, etc. The discussions of specific types of video sessions, such as VOD sessions, etc., are provided merely as examples to better illustrate the aspects of the various embodiments and are not intended to limit the various embodiments in any way. Other types of video sessions may be used with the various embodiments, and the other types of video sessions may be substituted in the various examples without departing from the spirit or scope of the invention.

FIG. 1 illustrates an VOD system 100 suitable for use with various embodiments. The VOD system 100 may include multiple devices, such as customer computing device 103, customer-premises equipment (CPE) 107 (e.g., cable modems/routers), cable modem termination system (CMTS) 108, VOD server 104, ad router server 105, inventory optimization server 120, MSO ADS 119, and programmer ADS 109. The customer computing device 103 may exchange data via one or more wired or wireless connections with the CPE 107. The CPE 107 may be connected via a network, such as a hybrid fiber-coaxial (HFC) network, to the CMTS 108 which may exchange data via the network with the CPE 107. The CMTS 108 may enable data to be exchanged between the customer computing device 103, CPE 107, and various devices of the operator network, such as the VOD server 104. The various devices of the operator network, such as the VOD server 104, the ad router server 105, the inventory optimization server 120, the MSO ADS 119, etc., may exchange data with one another via connections within the operator network and may exchange data with devices outside the operator network, such as programmer ADS 109 via the operator network's connections to the Internet 117.

In various embodiments, the VOD server 104, the ad router server 105, the inventory optimization server 120, the MSO ADS 119, etc., may be various different types of servers within the operator network (e.g., a network of an MSO). In various embodiments, the VOD server 104 may be a server providing VOD content from programmers (e.g., Fox, Lifetime, Scripts, Music Choice, etc.) to a user 102 via his or her computing device 103. The VOD server 104 may access a content store to provision selected VOD content to the user 102 for a VOD session. The VOD content may include breaks, such as pre-roll, mid-roll, and/or post-roll breaks, in which advertisements (or ads) may be inserted. The breaks in the VOD content may be defined by an ad map associated with the VOD content. The VOD server 104 may send an ad placement request for a VOD session to the ad router server 105 and in response may receive an ad list for the VOD session. The ad list may identify ads to be inserted into the breaks from the content store, and the VOD server 104 may insert the selected ads into the VOD stream based on the ad list. In this manner, the user 102 may view the selected ads while watching the VOD content.

In various embodiments, the ad router server 105 may determine ads for a VOD session and generate the ad list for the VOD session based on the determined ads. The ad router server 105 may send ad request messages to the programmer ADS 109 and the MSO ADS 119 to receive indications of the ads to select for a VOD session. The programmer who is provisioning the VOD content may control a certain percentage, such as eighty five percent of the advertising inventory for a VOD session as programmer inventory and the network operator may control a certain percentage, such as fifteen percent, of the advertising inventory for the VOD session as operator inventory (i.e., owned inventory). In various embodiments, the programmer ADS 109 may indicate selected ads for the programmer inventory to the ad router server 105 and the MSO ADS 119 may indicate selected ads for the operator inventory (i.e., owned inventory) and optionally any unassigned (i.e., transferred VOD ad placement opportunities that the programmer did not fill) inventory to the ad router server 105. In various embodiments, when the network operator (e.g., the MSO ADS 119), does not fill all its pre-assigned VOD ad placement opportunities, those unfilled network operator VOD ad placement opportunities may be offered to the programmer (e.g., the programmer ADS 109) as transferred VOD ad placement opportunities that the network operator did not fill. In this manner, the programmer ADS 109 may indicate selected ads for the programmer inventory (i.e., its owned inventory) and optionally any unassigned (i.e., transferred VOD ad placement opportunities that the network operator did not fill) inventory to the ad router server 105.

In various embodiments, the ad router server 105 may request unused inventory rules from the inventory optimization server 120. In various embodiments, the ad router server 105 may communicate ad metrics, such as harvest metrics, to the inventory optimization server 120. In various embodiments, the inventory optimization server 120 may enable definition on a per network operator and/or per programmer basis of a network operator's rights to use unused inventory (i.e., transferred VOD ad placement opportunities that the programmer may not fill).

Figure 2:
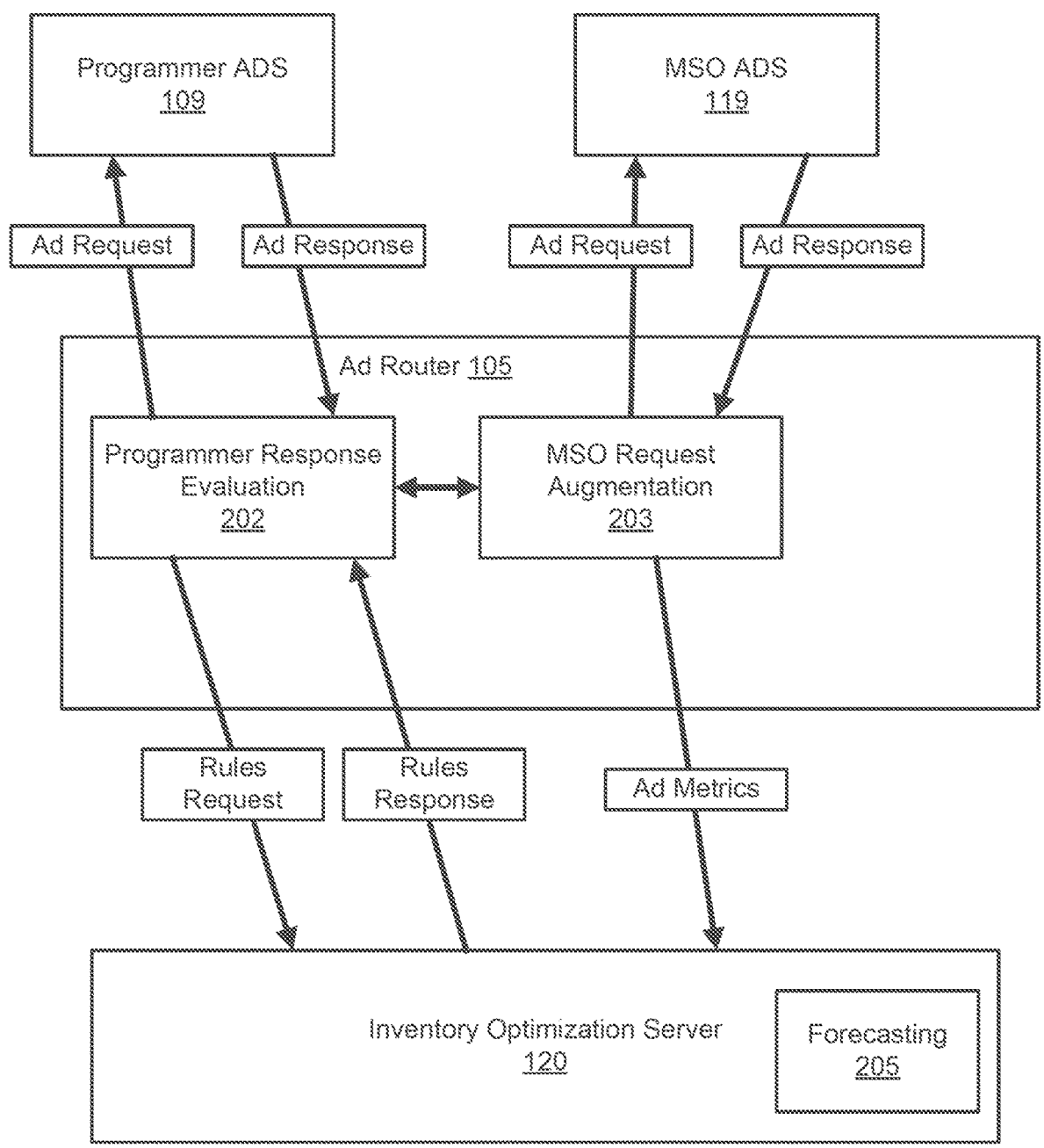
FIG. 2 is a block diagram illustrating interactions between components of an embodiment VOD system.

FIG. 2 is a block diagram illustrating interactions between components of an embodiment VOD system, such as VOD system 100 described with reference to FIG. 1. With reference to FIGS. 1 and 2, in various embodiments, the ad router server 105, inventory optimization server 120, programmer ADS 109, and MSO ADS 119 may exchange messages with one another to enable VOD dynamic ad inventory handling by a network operator. Based at least in part on ad inventory rules from the inventory optimization server 120 and an ad response message from the programmer ADS 109 indicating that unused programmer ad inventory is available for a VOD session, the ad router server 105 may generate and send an ad request message to the MSO ADS 119 indicating both pre-assigned network operator ad inventory (i.e., owned opportunities of the network operator) and the unused programmer ad inventory (i.e., transferred VOD ad placement opportunities that the programmer ADS 109 did not fill). The unused programmer ad inventory (i.e., transferred VOD ad placement opportunities that the programmer ADS 109 did not fill) may be filled with ads by the MSO ADS 119 to augment network operator VOD ad inventory in the VOD session. In a similar manner, based at least in part on ad inventory rules from the inventory optimization server 120 and an ad response message from the MSO ADS 119 indicating that unused network operator ad inventory is available for a VOD session, the ad router server 105 may generate and send an ad request message to the programmer ADS 109 indicating one or both of pre-assigned programmer ad inventory (i.e., owned opportunities of the programmer) and the unused network operator ad inventory (i.e., transferred VOD ad placement opportunities that the MSO ADS 119 did not fill). The unused network operator ad inventory (i.e., transferred VOD ad placement opportunities that the MSO ADS 119 did not fill) may be filled with ads by the programmer ADS 109 to augment programmer VOD ad inventory in the VOD session.

In various embodiments, the ad router server 105 may receive a placement request for a VOD session from a VOD server, such as VOD server 104. The placement request may identify attributes of the VOD session, such as the VOD content to be streamed for the VOD session, the network over which the VOD content may be streamed, the programmer providing the content, the ad map for the VOD session, etc. The placement request may be received in a programmer response evaluation service 202 running on a processor of the ad router server 105. Based at least in part on the placement request for the VOD session, the programmer response evaluation service 202 may determine one or more attributes of ad breaks in the VOD session. For example, the attributes of the ad breaks in the VOD session that may be determined may include the opportunity types (e.g., pre-roll, mid-roll, and/or post-roll, etc.), break numbers, programmer id, network id, etc.

The ad router server 105 may request unused inventory rules from the inventory optimization server 120 in a rules request message. The rules request message may be a message indicating one or more attributes of ad breaks in the VOD session, such as the opportunity types (e.g., pre-roll, mid-roll, and/or post-roll, etc.), break numbers, programmer id, network id, etc. The rules request message may be sent from the ad router server 105 to the inventory optimization server 120.

The inventory optimization server 120 may generate ad inventory rules based on inventory handling definitions on a per network operator and/or per programmer basis. The inventory handling definitions may govern a network operator's rights to use unused inventory (i.e., transferred VOD ad placement opportunities that the programmer may not fill). In various embodiments, such ad inventory rules may be based on one or more inventory handling definitions provided to the inventory optimization server by programmers and/or network operators. In various embodiments, ad inventor rules may include various limits on how unused inventory (i.e., transferred VOD ad placement opportunities that the programmer may not fill) may be handled. Such limits may include opportunity type limits (e.g., limiting transfer to pre-roll, mid-roll, and/or post-roll type ads, limiting transfer within mid-roll by mid-roll number, etc.), ad type limits (e.g., limiting transfer to paid ads and/or promo ads, etc.), programmer limits (e.g., limiting transfer to a certain number of times per programmer, etc.), network limits (e.g., limiting transfer to a certain number of times per network operator), session limits (e.g., limiting transfer to a maximum number of transfers per VOD session, etc.), time period limits (e.g., limiting transfer to a maximum number of transfers per day, week, month, year, etc.), break limits (e.g., limiting transfer to a maximum number of transfers per break period, etc.), content type limits (e.g., limiting transfer based on the type of content being served in the VOD session, etc.), combinations of those limits (e.g., limits by opportunity type and ad type, etc.), and/or any other type limits applicable to VOD ad placement. The ad inventory rules may include rights definitions for the ad inventory to direct how one or more ADSs assign ads. In various embodiments, an inventory optimization server 120 may communicate rules response messages to the ad router server 105 in response to the rules request message from the ad router server 105. The rules response message may indicate unused inventory rights and inventory limits to the ad router server 105. In various embodiments, the rules response message may indicate that a programmer providing content for a VOD session allows for transfer of unused ad inventory for that VOD session.

The ad router server 105 may generate an ad request message to the programmer ADS 109 indicating the programmer ad inventory that is available for the VOD session. In various embodiments, the ad request message may be a VAST request according to the VAST protocol, a placement request according to the SCTE 130 protocol, etc. The programmer who is provisioning the VOD content may control a certain percentage, such as eighty five percent of the advertising inventory for a VOD session as programmer inventory, and the programmer ADS 109 may select ads to fill that inventory. However, a portion of that ad inventory may go unused by the programmer ADS 109. The programmer response evaluation service 202 may receive an ad response message from the programmer ADS 109 indicating any ads selected by the programmer ADS 109 to fill the programmer inventory. The programmer response evaluation service 202 may determine whether any of the programmer ad inventory was unfiled.

In response to the ad response message from the programmer ADS 109 indicating unused programmer ad inventory is available for the VOD session, the programmer response evaluation service 202 may indicate the availability of unused programmer ad inventory to a MSO request augmentation service 203 running on a processor of the ad router server 105. Via the MSO request augmentation service 203, the ad router server 105 may generate and send an ad request message to the MSO ADS 119 indicating both pre-assigned network operator ad inventory (i.e., owned opportunities of the network operator) and the unused programmer ad inventory (i.e., transferred VOD ad placement opportunities that the programmer did not fill). In various embodiments, the ad request message may be a VAST request according to the VAST protocol, a placement request according to the SCTE 130 protocol, etc. In various embodiments, the ad request message may identify the unused programmer ad inventory (i.e., transferred VOD ad placement opportunities that the programmer did not fill), such as by provider, opportunity type, mid-roll number, and ad type.

The MSO ADS 119 may receive the ad request message indicating both pre-assigned network operator ad inventory and unused programmer ad inventory. In various embodiments, the selection of ads to fill in owned (i.e., pre-assigned) and/or unassigned (i.e., transferred VOD ad placement opportunities that the programmer did not fill) inventory may be handled by a decision service running on a processor of the MSO ADS 119. The MSO ADS 119 may be configured to distinguish between owned and transferred unused opportunities. In some embodiments, the MSO ADS 119 may preferential place ads into the owned opportunities over unused opportunities. For example, the use of unused opportunities may be restricted to placements from ad campaigns which are behind plan by a selected percentage. The selected percentage may be a parameter set for each campaign individually. In various embodiments, the option to select ads to fill in owned (i.e., pre-assigned) and/or unassigned (i.e., transferred VOD ad placement opportunities that the programmer did not fill) inventory may be controlled by a campaign manager service running on a processor of the MSO ADS 119. The campaign manager service may enable or disable the use of unassigned (i.e., transferred VOD ad placement opportunities that the programmer did not fill) inventory for an advertising campaign.

For example, the campaign manager service may configure an advertising campaign such that the use of unassigned (i.e., transferred VOD ad placement opportunities that the programmer did not fill) is allowed or not allowed for a specific campaign.

In various embodiments, the MSO ADS 119 may generate and send an ad response message indicating the selected ads. The ad response message may delineate any selected ads for pre-assigned network operator ad inventory (i.e., owned opportunities of the network operator) separately from any selected ads to fill unused programmer ad inventory (i.e., transferred VOD ad placement opportunities that the programmer did not fill). In various embodiments, the ad response message may identify the ads assigned to the unused programmer ad inventory (i.e., transferred VOD ad placement opportunities that the programmer did not fill), such as by network, opportunity type, mid-roll number, and ad type.

In some embodiments, a portion of that ad inventory may go unused by the MSO ADS 119. The MSO request augmentation service 203 may receive an ad response message from the MSO ADS 119 indicating any ads selected by the MSO ADS 119 to fill the network operator inventory and/or transferred VOD ad placement opportunities that the programmer did not fill. The MSO request augmentation service 203 may determine whether any of the network operator ad inventory was unfilled.

In response to the ad response message from the MSO ADS 119 indicating unused network operator ad inventory is available for the VOD session, the MSO request augmentation service 203 may indicate the availability of unused network operator ad inventory to the programmer response evaluation service 202 running on a processor of the ad router server 105. Via the programmer response evaluation service 202, the ad router server 105 may generate and send an ad request message to the programmer ADS 109 indicating one or both of pre-assigned programmer operator ad inventory (i.e., owned opportunities of the programmer) and the unused network operator ad inventory (i.e., transferred VOD ad placement opportunities that the network operator did not fill). In various embodiments, the ad request message may be a VAST request according to the VAST protocol, a placement request according to the SCTE 130 protocol, etc. In various embodiments, the ad request message may identify the unused network operator ad inventory (i.e., transferred VOD ad placement opportunities that the network operator did not fill), such as by provider, opportunity type, mid-roll number, and ad type.

The programmer ADS 109 may receive the ad request message indicating one or both of pre-assigned programmer operator ad inventory and unused network operator ad inventory. In various embodiments, the selection of ads to fill in owned (i.e., pre-assigned) and/or unassigned (i.e., transferred VOD ad placement opportunities that the network operator did not fill) inventory may be handled by a decision service running on a processor of the programmer ADS 109. The programmer ADS 109 may be configured to distinguish between owned and transferred unused opportunities. In various embodiments, the programmer ADS 109 may generate and send an ad response message indicating the selected ads. The ad response message may delineate any selected ads for pre-assigned programmer ad inventory (i.e., owned opportunities of the programmer) separately from any selected ads to fill unused network operator ad inventory (i.e., transferred VOD ad placement opportunities that the network operator did not fill). In various embodiments, the ad response message may identify the ads assigned to the unused network operator ad inventory (i.e., transferred VOD ad placement opportunities that the network operator did not fill), such as by network, opportunity type, mid-roll number, and ad type.

The ad router server 105 may generate an ad list for the VOD session and send the ad list to the VOD server. In various embodiments, the ad router server 105 may communicate ad metrics, such as harvest metrics, to the inventory optimization server 120. Ad metrics, such as harvest metrics, may include the programmer, network, date, time, session, break number, break sequence, and placed ad identifier (when placement occurs) for each unused programmer ad inventory (i.e., transferred VOD ad placement opportunities that the programmer did not fill) supplied to the MSO ADS 119 in an ad request message. In various embodiments, the inventory optimization server 120 may evaluate time-based inventory limits based on the received ad metrics and may update ad inventory rules based at least in part on the received ad metrics. In various embodiments, a forecasting service running on a processor of the inventory optimization server 120 may forecast ad inventory levels based on the received ad metrics. In various embodiments, forecasting ad inventory levels may be at various confidence levels based on a length of time the ad metrics may cover. For example, longer duration coverage by ad metrics may result in higher confidence levels.

While illustrated as separate devices in FIGS. 1 and 2, the inventory optimization server 120, the ad router server 105, and MSO ADS 119, this is only one example configuration of a VOD system according to the various embodiments and other configurations of the inventory optimization server 120, the ad router server 105, and MSO ADS 119 may be substituted in the various examples. For example, the inventory optimization server 120, the ad router server 105, and MSO ADS 119 may be different server modules running on the same computing device.

Figure 3:
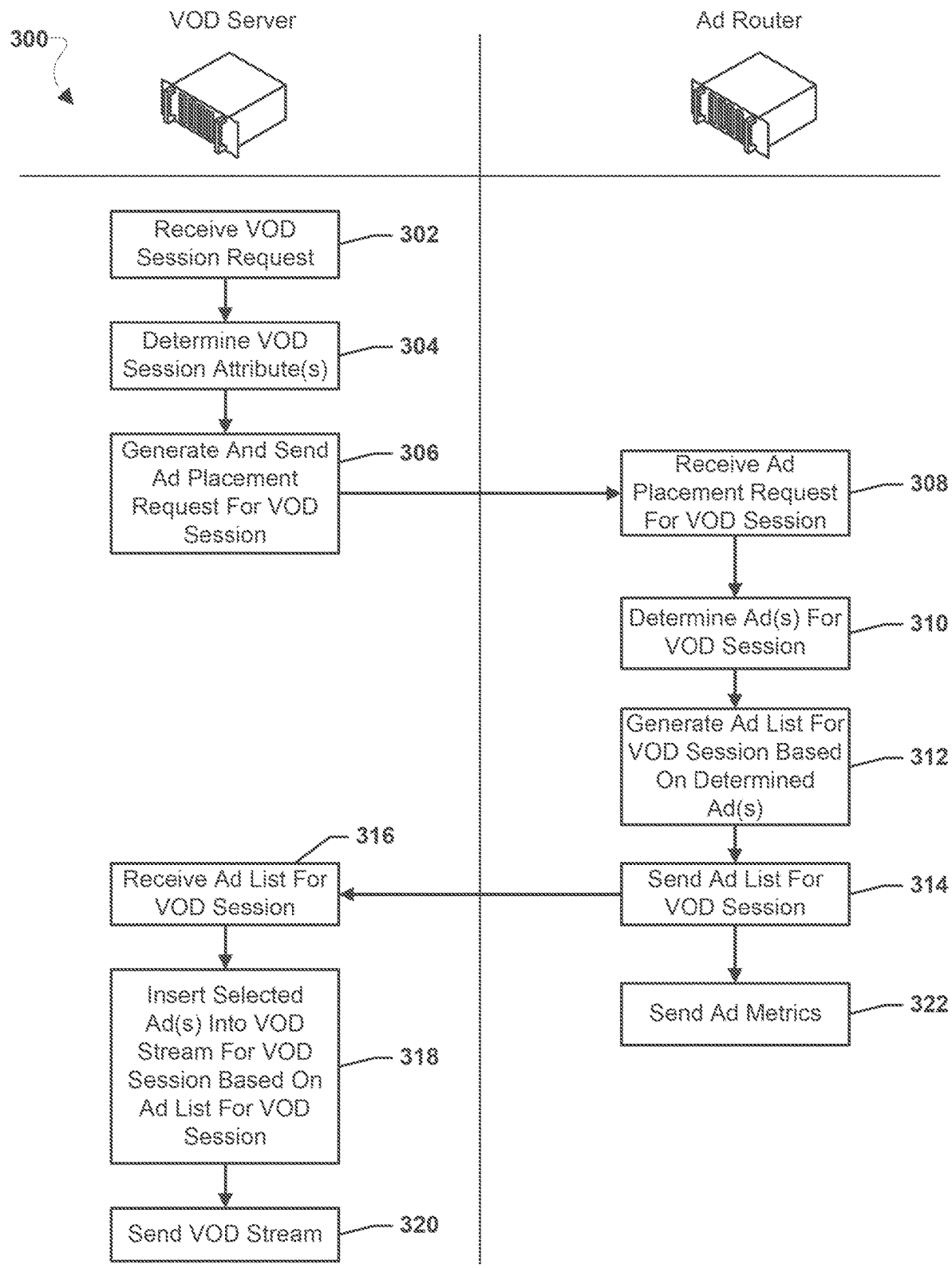
FIG. 3 is a process flow diagram illustrating an embodiment method for VOD ad insertion.

FIG. 3 is a process flow diagram illustrating an embodiment method 300 for VOD ad insertion. With reference to FIGS. 1-3, in various embodiments, the operations of method 300 may be performed by a VOD server, such as VOD server 104 in communication with an ad router server, such as ad router server 105.

In block 302, the VOD server may receive a VOD session request. A VOD session request may be a message received from a computing device associated with a user desiring to view VOD content. The VOD session request may identify the VOD content to be viewed, the network used by the computing device to stream the VOD session, etc.

In block 304, the VOD server may determine one or more VOD session attributes. The VOD session attributes may be parameters of the VOD session, such as the VOD content identifier, an identifier of the programmer providing the VOD content, an identifier of the network used by the computing device to stream the VOD session, an ad map for the VOD session, etc.

In block 306, the VOD server may generate and send an ad placement request for the VOD session to the ad router server. The ad placement request may indicate one or more of the determined VOD session attributes. In block 308, the ad router server may receive the ad placement request for the VOD session. In block 310, the ad router server may determine one or more ads for the VOD session. In various embodiments, the ad router server may be configured to augment network operator VOD ad inventory in a VOD session with transferred VOD ad placement opportunities that a programmer may not fill (i.e., unused ad opportunities). For example, the ad router server may determine the one or more ads for the VOD session according to the operations of method 400 described with reference to FIG. 4.

In block 312, the ad router server may generate an ad list for the VOD session based on the determined one or more ads. The ad list may identify the ad ids of ads to be inserted into the breaks of the VOD session. In block 314, the ad router server may send the ad list for the VOD session to the VOD server. In block 322, the ad router server may send ad metrics. In various embodiments, the ad router server may communicate ad metrics, such as harvest metrics, to an inventory optimization server. Ad metrics, such as harvest metrics, may include the programmer, network, date, time, session, break number, break sequence, and placed ad identifier (when placement occurs) for each unused programmer ad inventory (i.e., transferred VOD ad placement opportunities that the programmer did not fill).

In block 316, the VOD server may receive the ad list for the VOD session. The ad list may identify ads to be inserted into the breaks from the content store available to the VOD server. In block 318, the VOD server may insert the selected ads into the VOD stream for the session based on the ad list for the VOD session. In block 320, the VOD server may send the VOD stream. In this manner, the user may view the selected ads while watching the VOD content.

Figure 4A:
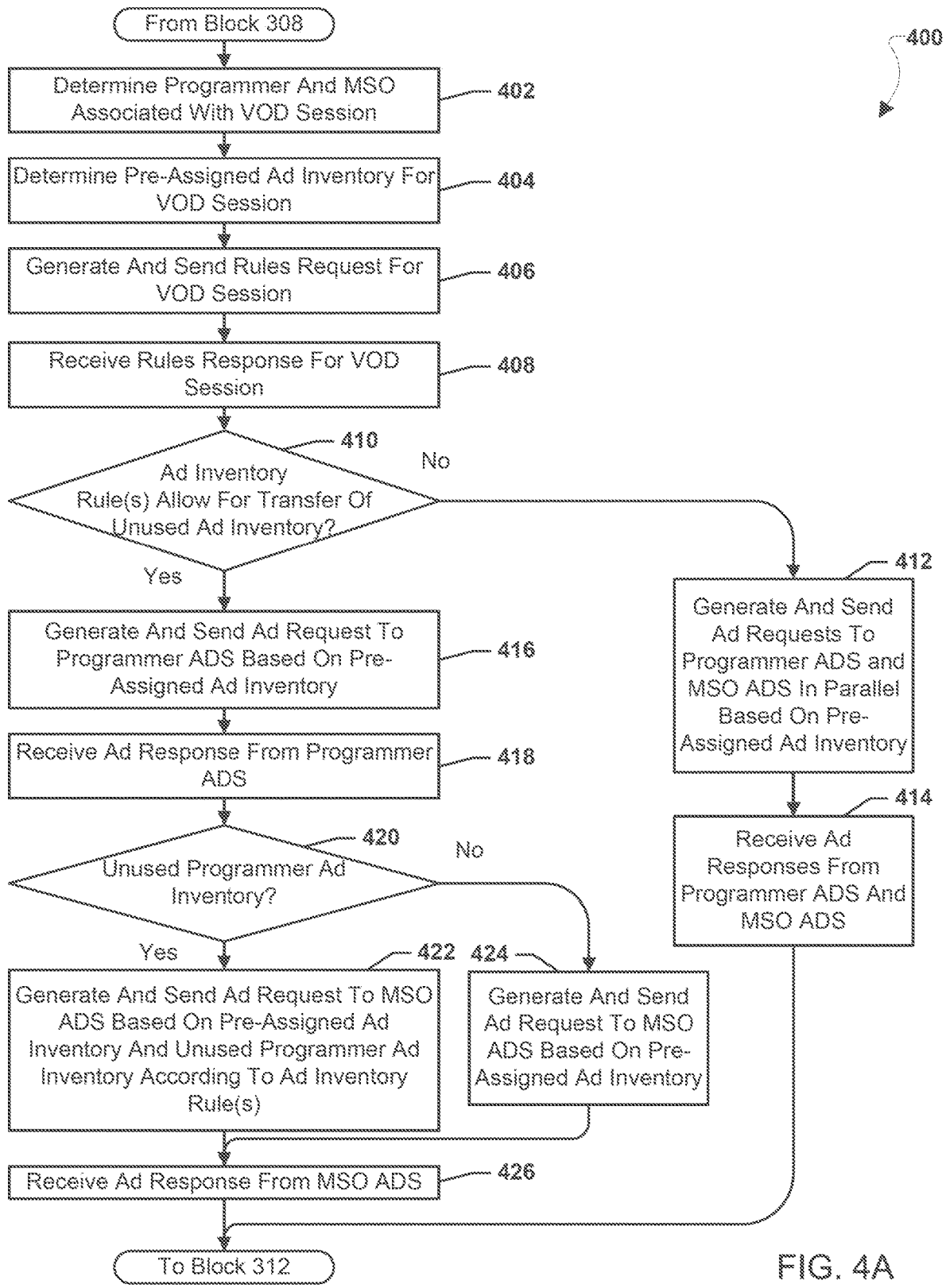
FIG. 4A is a process flow diagram illustrating an embodiment method for dynamically determining ads for insertion in a VOD session.

FIG. 4A is a process flow diagram illustrating an embodiment method 400 for dynamically determining ads for insertion in a VOD session. With reference to FIGS. 1-4A, the operations of method 400 may be performed by an ad router server, such as ad router server 105. In various embodiments, the operations of method 400 may be performed in conjunction with the operations of method 300 (FIG. 3) to determine one or more ads for the VOD session in block 310.

In response to receiving an ad placement request for the VOD session (block 308 of method 300), the ad router server may determine a programmer and network operator (e.g., an MSO) associated with the VOD session in block 402. In various embodiments, the ad router server may determine the programmer and network operator (e.g., an MSO) for the VOD session based on VOD session attributes in the ad placement request message.

In block 404, the ad router server may determine the pre-assigned ad inventory for the VOD session. The pre-assigned ad inventory may include both pre-assigned programmer ad inventory (i.e., those ad inventory opportunities owned by the programmer) and pre-assigned network operator ad inventory (i.e., owned opportunities of the network operator).

In block 406, the ad router server may generate and send a rules request message for the VOD session. The rules request message may be a message requesting ad inventor rules for the VOD session. The rules request message may identify the programmer and the network operator (e.g., MSO) associated with the VOD session.

In block 408, the ad router server may receive a rules response message for the VOD session. The rules response message may be a message including indications of one or more ad inventory rules applicable to the VOD session. In various embodiments, such ad inventory rules may be based on one or more inventory handling definitions provided to an inventory optimization server by programmers and/or network operators. In various embodiments, ad inventor rules may include various limits on how unused inventory (i.e., transferred VOD ad placement opportunities that the programmer may not fill) may be handled. Such limits may include opportunity type limits (e.g., limiting transfer to pre-roll, mid-roll, and/or post-roll type ads, limiting transfer within mid-roll by mid-roll number, etc.), ad type limits (e.g., limiting transfer to paid ads and/or promo ads, etc.), programmer limits (e.g., limiting transfer to a certain number of times per programmer, etc.), network limits (e.g., limiting transfer to a certain number of times per network operator), session limits (e.g., limiting transfer to a maximum number of transfers per VOD session, etc.), time period limits (e.g., limiting transfer to a maximum number of transfers per day, week, month, year, etc.), break limits (e.g., limiting transfer to a maximum number of transfers per break period, etc.), content type limits (e.g., limiting transfer based on the type of content being served in the VOD session, etc.), combinations of those limits (e.g., limits by opportunity type and ad type, etc.), and/or any other type limits applicable to VOD ad placement. For example, an ad inventory rule may indicate that a certain programmer has agreed with a certain network operator to allow mid-roll ad inventory to be transferred from the programmer to the network operator limited to two transfers per break period. As another example, an ad inventory rule may indicate that no ad inventory may be transferred. As a further example, an ad inventory rule may indicate that all ad inventory may be transferred.

In determination block 410, the ad router server may determine whether one or more ad inventory rules allow for the transfer of unused ad inventory. In response to the ad inventory rules not allowing for transfer of unused ad inventory (i.e., determination block 410="No"), the ad router server may generate and send ad request messages to the programmer ADS and MSO ADS in parallel based on the pre-assigned ad inventory in block 412. In various embodiments, the ad request messages may be VAST requests according to the VAST protocol, placement requests according to the SCTE 130 protocol, etc. In block 414, the ad router server may receive an ad response message from the programmer ADS and MSO ADS and proceed to block 312 of method 300. In various embodiments, the ad response messages may be VAST responses according to the VAST protocol, placement responses according to the SCTE 130 protocol, etc.

In response to the ad inventory rules allowing for transfer of unused ad inventory (i.e., determination block 410="Yes"), the ad router server may generate and send an ad request message to the programmer ADS based on the pre-assigned ad inventory in block 416. In various embodiments, the ad request message may be a VAST request according to the VAST protocol, a placement request according to the SCTE 130 protocol, etc. The ad router server may hold any ad request to the MSO ADS until a response from the programmer ADS is received. In this manner, the ad router server may create the opportunity to determine whether there may be any unused programmer ad inventory for the VOD session.

In block 418, the ad router server may receive an ad response message from the programmer ADS. In various embodiments, the ad response message may be a VAST response according to the VAST protocol, a placement response according to the SCTE 130 protocol, etc. In determination block 420, the ad router server may determine whether there is any unused programmer ad inventory. The programmer ADS may not always select sufficient ads to fill all the ad inventory owned by the programmer, and the ad response message may indicate less selected ads than were identified as available in the ad request message. The ad router server may compare the number of ads in the ad response message to the number of ads owned by the programmer for the VOD session to determine whether there is any unused programmer ad inventory. The number of ads in the ad response message being less than the number of ads owned by the programmer for the VOD session may indicate there is unused programmer ad inventory. In response to determining that there is no unused programmer ad inventory (i.e., determination block 420="No"), the ad router server may generate and send an ad request message to the MSO ADS based on pre-assigned inventory in block 424. In various embodiments, the ad request message may be a VAST request according to the VAST protocol, a placement request according to the SCTE 130 protocol, etc.

In response to determining that there is unused programmer ad inventory (i.e., determination block 420="Yes"), the ad router server may generate and send an ad request message to the MSO ADS based on pre-assigned ad inventory and unused programmer ad inventory according to the ad inventory rules in block 422. In various embodiments, the ad router server may determine whether any limits defined in the ad inventory rules have been met or exceeded before generating the ad request message. In various embodiments, the ad request message may be a VAST request according to the VAST protocol, a placement request according to the SCTE 130 protocol, etc. In various embodiments, the ad request message may delineate any pre-assigned network operator ad inventory (i.e., owned opportunities of the network operator) separately from any unused programmer ad inventory (i.e., transferred VOD ad placement opportunities that the programmer did not fill). For example, unused programmer ad inventory opportunities may be tagged as such in the ad request message. In various embodiments, the ad request message may identify the unused programmer ad inventory (i.e., transferred VOD ad placement opportunities that the programmer did not fill), such as by programmer, opportunity type, and ad type.

In block 426, the ad router server may receive an ad response message from the MSO ADS and proceed to block 312 of method 300. The ad response message may be a VAST response according to the VAST protocol, a placement response according to the SCTE 130 protocol, etc. The ad response message may delineate any ads selected for pre-assigned network operator ad inventory (i.e., owned opportunities of the network operator) separately from any ads selected for unused programmer ad inventory (i.e., transferred VOD ad placement opportunities that the programmer did not fill).

Figure 4B:
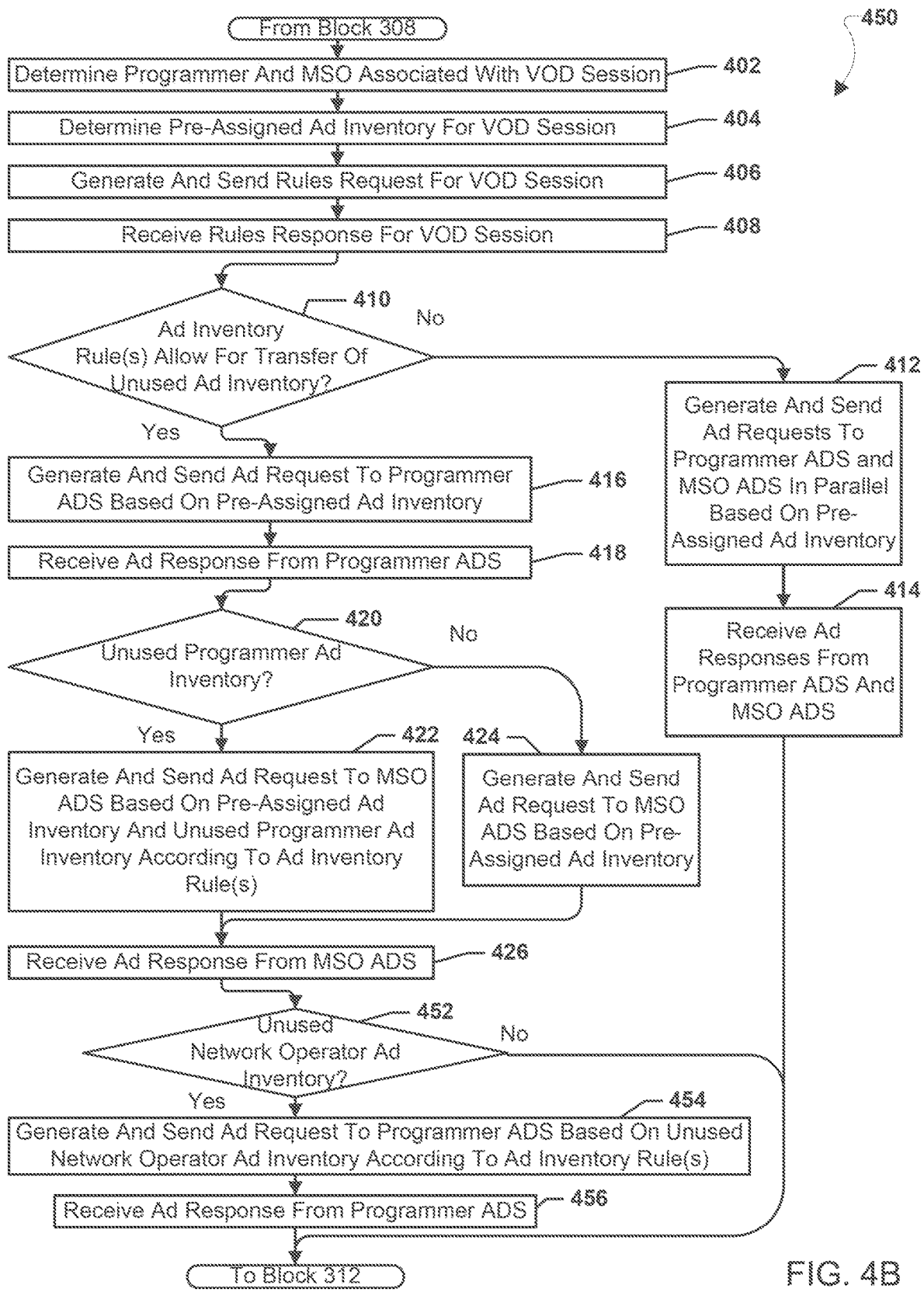
FIG. 4B is a process flow diagram illustrating another embodiment method for dynamically determining ads for insertion in a VOD session.

FIG. 4B is a process flow diagram illustrating an embodiment method 450 for dynamically determining ads for insertion in a VOD session. With reference to FIGS. 1-4B, the operations of method 450 may be performed by an ad router server, such as ad router server 105. In various embodiments, the operations of method 450 may be performed in conjunction with the operations of method 300 (FIG. 3) to determine one or more ads for the VOD session in block 310. In blocks 402-426, the ad router server may perform operations of like numbered blocks of method 400 described with reference to FIG. 4.

In determination block 452, the ad router server may determine whether there is any unused network operator ad inventory. The MSO ADS may not always select sufficient ads to fill all the ad inventory owned by the network operator, and the ad response message may indicate less selected ads than were identified as available in the ad request message. The ad router server may compare the number of ads in the ad response message to the number of ads owned by the network operator for the VOD session to determine whether there is any unused network operator ad inventory. The number of ads in the ad response message being less than the number of ads owned by the network operator for the VOD session may indicate there is unused network operator ad inventory. In response to determining that there is no unused network operator ad inventory (i.e., determination block 452="No"), the ad router server may proceed to block 312 of method 300.

In response to determining that there is unused network operator ad inventory (i.e., determination block 452="Yes"), the ad router server may generate and send an ad request message to the programmer ADS based on unused network operator ad inventory according to the ad inventory rules in block 452. In various embodiments, the ad router server may determine whether any limits defined in the ad inventory rules have been met or exceeded before generating the ad request message. In various embodiments, the ad request message may be a VAST request according to the VAST protocol, a placement request according to the SCTE 130 protocol, etc. In various embodiments, the ad request message may delineate any pre-assigned programmer ad inventory (i.e., owned opportunities of the programmer) separately from any unused network operator ad inventory (i.e., transferred VOD ad placement opportunities that the network operator did not fill). For example, unused network operator ad inventory opportunities may be tagged as such in the ad request message. In various embodiments, the ad request message may identify the unused network operator ad inventory (i.e., transferred VOD ad placement opportunities that the network operator did not fill), such as by programmer, opportunity type, and ad type. In block 456, the ad router server may receive an ad response message from the programmer ADS and proceed to block 312 of method 300. The ad response message may be a VAST response according to the VAST protocol, a placement response according to the SCTE 130 protocol, etc. The ad response message may delineate any ads selected for pre-assigned programmer ad inventory (i.e., owned opportunities of the programmer) separately from any ads selected for unused network operator ad inventory (i.e., transferred VOD ad placement opportunities that the network operator did not fill).

Figure 5:
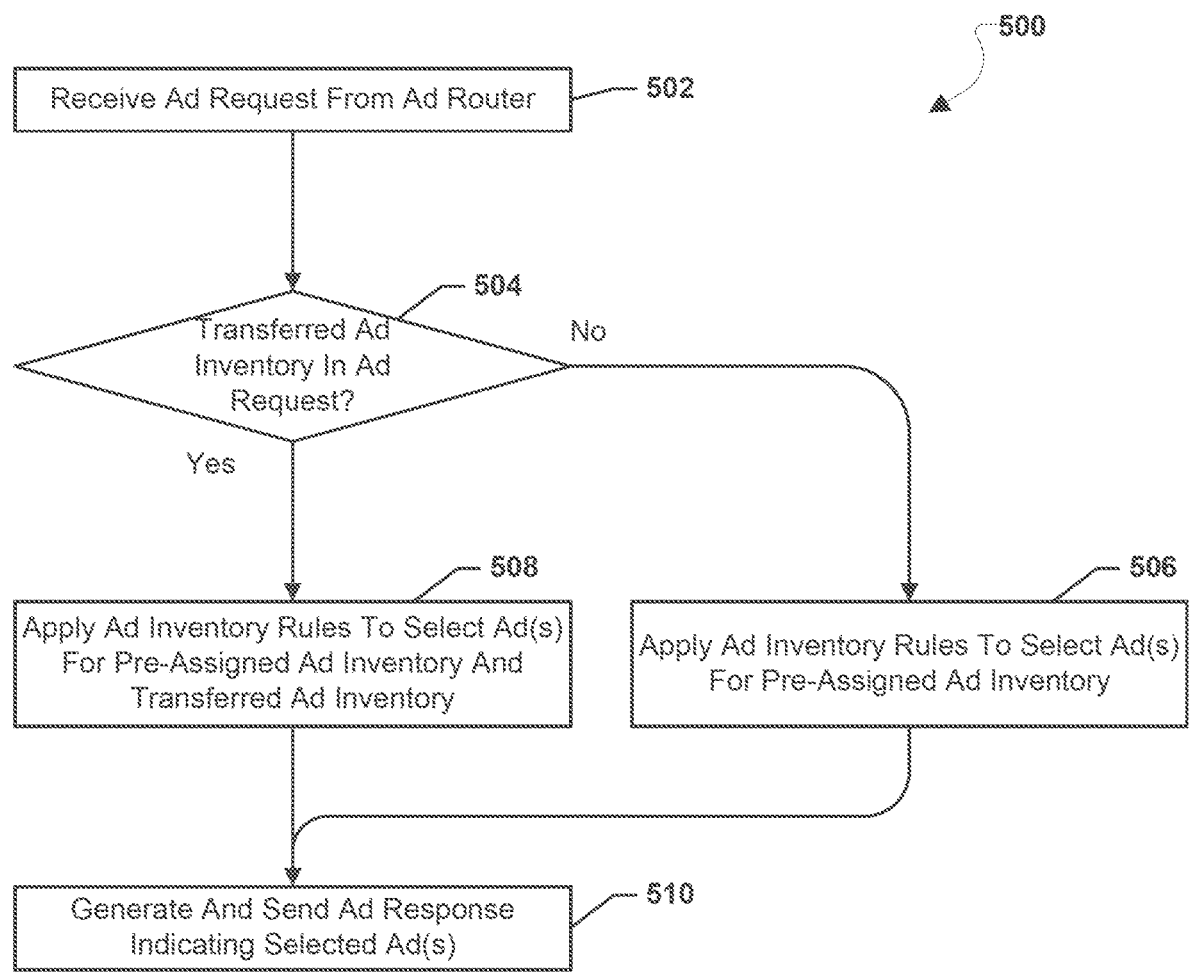
FIG. 5 is a process flow diagram illustrating an embodiment method for augmenting ad inventory with unused ad inventory.

FIG. 5 is a process flow diagram illustrating an embodiment method 500 for augmenting ad inventory, such as augmenting network operator ad inventory with unused programmer ad inventory and/or augmenting programmer ad inventory with unused network operator ad inventory. With reference to FIGS. 1-4B, the operations of method 500 may be performed by a network operator server, such as a network operator ADS, network operator ad server, etc., and/or may be performed by a programmer server, such as a programmer ADS, programmer ad server, etc. As a specific example, the network operator server may be an MSO ADS 119. As another specific example, the programmer server may be an programmer ADS 109. In various embodiments, the operations of method 500 may be performed in conjunction with the operations of methods 300, 400, and 450.

In block 502, the MSO ADS or programmer ADS may receive an ad request message from an ad router server. In various embodiments, the ad request message may be a VAST request according to the VAST protocol, a placement request according to the SCTE 130 protocol, etc.

In determination block 504, the MSO ADS or programmer ADS may determine whether any transferred ad inventory is identified in the ad request message. In various embodiments, the ad request message may delineate any pre-assigned network operator ad inventory (i.e., owned opportunities of the network operator) separately from any unused programmer ad inventory (i.e., transferred VOD ad placement opportunities that the programmer did not fill). For example, unused programmer ad inventory opportunities may be tagged as such in the ad request message. In various embodiments, the ad request message may delineate any pre-assigned programmer ad inventory (i.e., owned opportunities of the programmer) separately from any unused network operator ad inventory (i.e., transferred VOD ad placement opportunities that the network operator did not fill). For example, unused network operator ad inventory opportunities may be tagged as such in the ad request message. The MSO ADS or programmer ADS may parse the ad request message to detect the presence of any indications associated with unused programmer ad inventory or unused network operator ad inventory, respectively, to determine whether any transferred ad inventory is identified in the ad request message. The presence of indications associated with unused programmer ad inventory or the presence of indications associated with unused network operator ad inventory may indicate transferred ad inventory is identified in the ad request message.

In response to determining that transferred ad inventory is indicated in the ad request message (i.e., determination block 504="Yes"), the MSO ADS or programmer ADS may apply ad inventory rules to select one or more ads for pre-assigned ad inventory and transferred ad inventory in block 508. For example, ad inventory rules may require the use of owned inventory before making placements within unused inventory and the MSO ADS or programmer ADS may fill all available owned inventory opportunities before transferred opportunities. In some embodiments, the MSO ADS or programmer ADS may preferential place ads into the owned opportunities over unused opportunities. For example, the use of unused opportunities may be restricted to placements from ad campaigns which are behind plan by a selected percentage. The selected percentage may be a parameter set for each campaign individually.

In response to determining that no transferred ad inventory is indicated in the ad request message (i.e., determination block 504="No"), the MSO ADS or programmer ADS may apply ad inventory rules to select one or more ads for pre-assigned ad inventory in block 506.

In block 510, the MSO ADS or programmer ADS may generate and send an ad response message indicating the selected ads. In various embodiments, the ad response message may be a VAST request according to the VAST protocol, a placement request according to the SCTE 130 protocol, etc. When the MSO ADS generates the ad response message, the ad response message may delineate any ads selected for pre-assigned network operator ad inventory (i.e., owned opportunities of the network operator) separately from any ads selected for unused programmer ad inventory (i.e., transferred VOD ad placement opportunities that the programmer did not fill). When the programmer ADS generates the ad response message, the ad response message may delineate any ads selected for pre-assigned programmer ad inventory (i.e., owned opportunities of the programmer) separately from any ads selected for unused network operator ad inventory (i.e., transferred VOD ad placement opportunities that the network operator did not fill).

Figure 6:
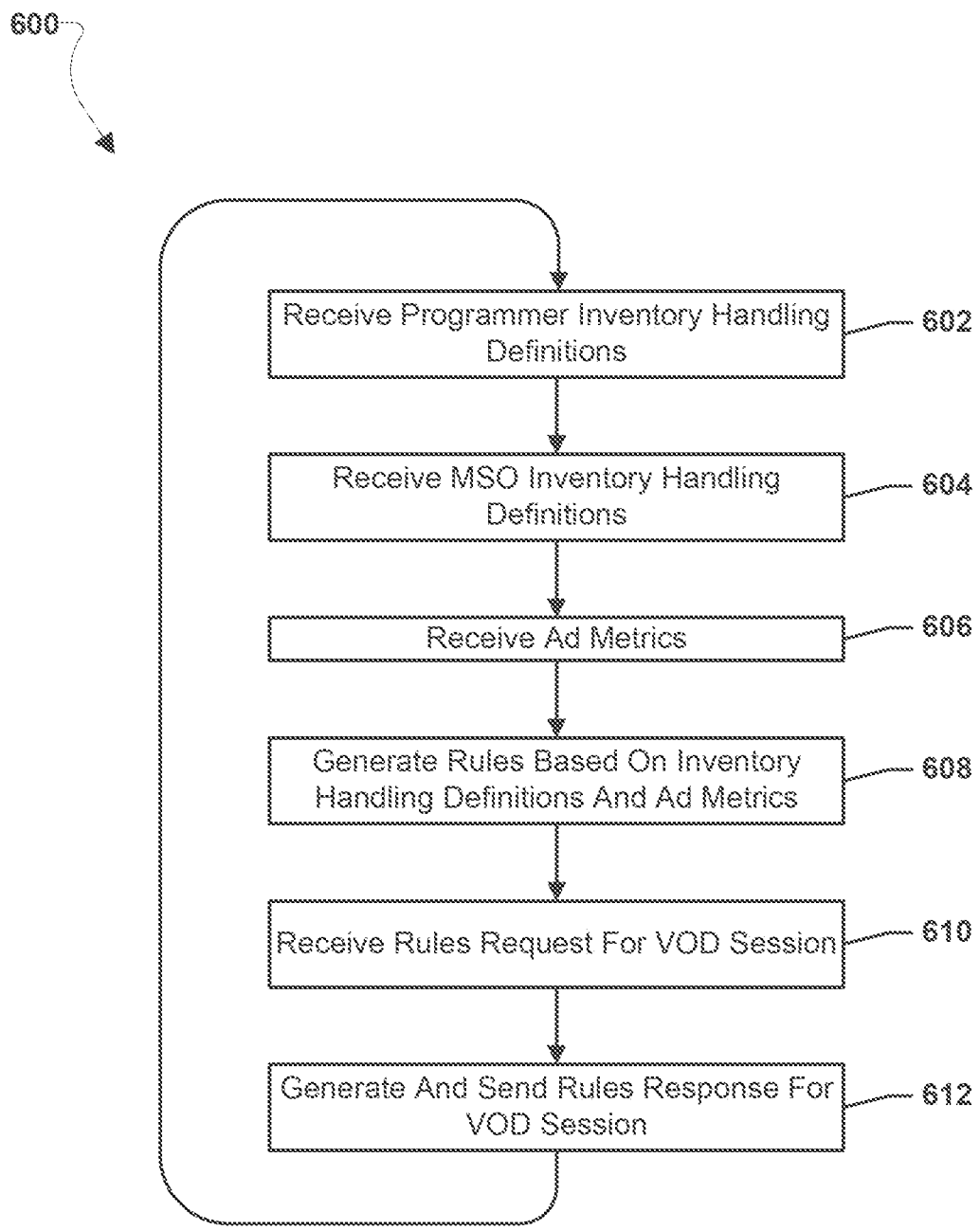
FIG. 6 is a process flow diagram illustrating an embodiment method for generating ad inventory handling rules.

FIG. 6 is a process flow diagram illustrating an embodiment method 600 for generating ad inventory handling rules. With reference to FIGS. 1-6, the operations of method 600 may be performed by a network server, such as an inventory optimization server 120. In various embodiments, the operations of method 600 may be performed in conjunction with the operations of methods 300, 400, 450, and 500.

In block 602, the inventory optimization server may receive programmer inventory handling definitions. Programmer inventory handling definitions may define a programmer's agreement to allow unused inventory (i.e., transferred VOD ad placement opportunities that the programmer may not fill) to be used by an MSO. In block 604, the inventory optimization server may receive an MSO inventory handling definition. An MSO inventory handling definition may define MSO's willingness to use unused inventory (i.e., transferred VOD ad placement opportunities that the programmer may not fill).

In block 606, the inventory optimization server may receive ad metrics. Ad metrics, such as harvest metrics, may include the programmer, network, date, time, session, break number, break sequence, and placed ad identifier (when placement occurs) for each unused programmer ad inventory (i.e., transferred VOD ad placement opportunities that the programmer did not fill).

In block 608, the inventory optimization server may generate ad inventory rules based on inventory handling definitions and ad metrics. In various embodiments, ad inventor rules may include various limits on how unused inventory (i.e., transferred VOD ad placement opportunities that the programmer may not fill) may be handled. Such limits may include opportunity type limits (e.g., limiting transfer to pre-roll, mid-roll, and/or post-roll type ads, limiting transfer within mid-roll by mid-roll number, etc.), ad type limits (e.g., limiting transfer to paid ads and/or promo ads, etc.), programmer limits (e.g., limiting transfer to a certain number of times per programmer, etc.), network limits (e.g., limiting transfer to a certain number of times per network operator), session limits (e.g., limiting transfer to a maximum number of transfers per VOD session, etc.), time period limits (e.g., limiting transfer to a maximum number of transfers per day, week, month, year, etc.), break limits (e.g., limiting transfer to a maximum number of transfers per break period, etc.), content type limits (e.g., limiting transfer based on the type of content being served in the VOD session, etc.), combinations of those limits (e.g., limits by opportunity type and ad type, etc.), and/or any other type limits applicable to VOD ad placement.

In block 610, the inventory optimization server may receive a rules request for a VOD session. The rules request message may be a message requesting ad inventory rules for the VOD session. The rules request message may identify the programmer and the network operator (e.g., MSO) associated with the VOD session. In block 612, the inventory optimization server may generate and send a rules response for the VOD session. The rules response message may be a message including indications of one or more ad inventory rules applicable to the VOD session. The inventory optimization server may generate the rules response message by comparing the programmer and/or network operator (e.g., MSO) indicated in the rules request message to the ad inventory rules. Matching ad inventory rules may be included in the rules response message.

Figure 7:
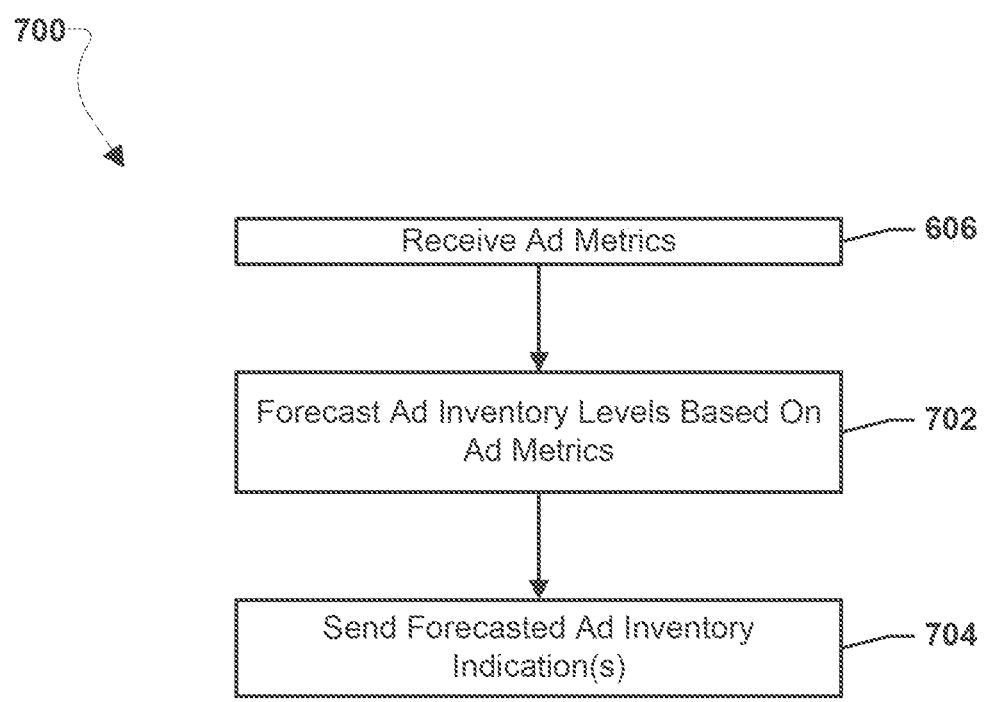
FIG. 7 is a process flow diagram illustrating an embodiment method for forecasting ad inventory levels.

FIG. 7 is a process flow diagram illustrating an embodiment method for forecasting ad inventory levels. With reference to FIGS. 1-7, the operations of method 700 may be performed by a network server, such as an inventory optimization server 120. In various embodiments, the operations of method 700 may be performed in conjunction with the operations of methods 300, 400, 450, 500, and 600.

In block 606, the inventory optimization server may receive ad metrics as described with reference to method 600. In block 702, the inventory optimization server may forecast ad inventory levels based on the ad metrics. In various embodiments, forecasting ad inventory levels may include estimating the combined availability of unused programmer ads and owned ad opportunities for VOD content in the future based on past availability of unused programmer ads and owned ad opportunities for that VOD content. In various embodiments, forecasting ad inventory levels may be at various confidence levels based on a length of time the ad metrics may cover. For example, longer duration coverage by ad metrics may result in higher confidence levels. Various embodiments may enable the forecasting of unused inventory using historical analysis of unused inventory volumes.

In block 704, the inventory optimization server may send forecasted ad inventory indications. For example, the inventory optimization server may send the forecasted ad inventory indications to computing devices of ad sellers and/or ad buyers. In this manner, ad sellers and/or ad buyers may forecast advertising demands and shortages.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 400, 450, 500, 600, and 700 may be substituted for or combined with one or more operations of the methods 300, 400, 450, 500, 600, and 700 and vice versa.

Figure 8:
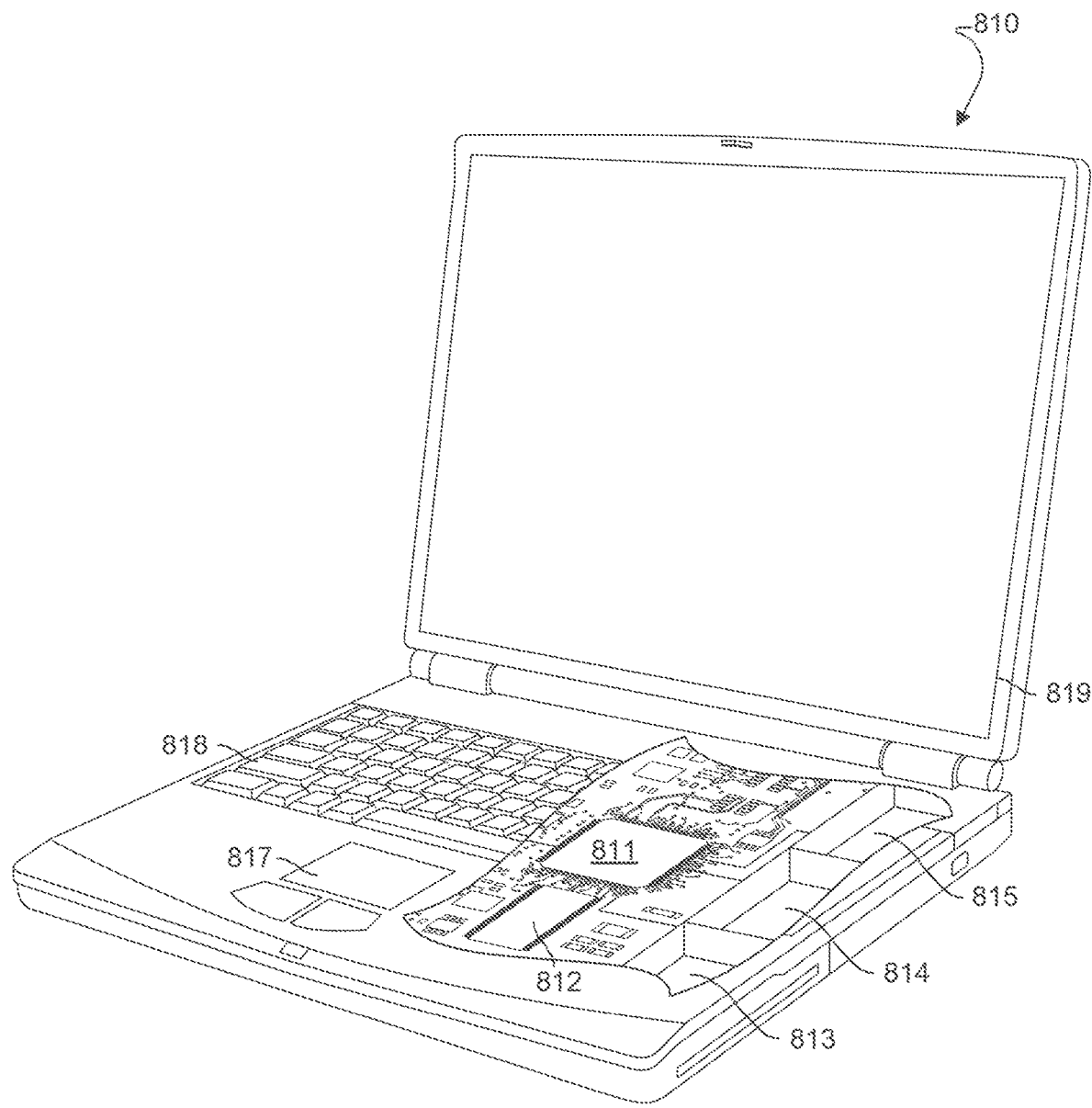
FIG. 8 is a component diagram of an example computing device suitable for use with various embodiments.

The various embodiments (including, but not limited to, embodiments discussed above with reference to FIGS. 1-7) described above may also be implemented within a variety of computing devices, such as a laptop computer 810 as illustrated in FIG. 8. Many laptop computers include a touch pad touch surface 817 that serves as the computer's pointing device, and thus may receive drag, scroll, and flick gestures similar to those implemented on mobile computing devices equipped with a touch screen display and described above. A laptop computer 810 will typically include a processor 811 coupled to volatile memory 812 and a large capacity non-volatile memory, such as a disk drive 813 of Flash memory. The laptop computer 810 may also include a floppy disc drive 814 and a compact disc (CD) drive 815 coupled to the processor 811. The laptop computer 810 may also include a number of connector ports coupled to the processor 811 for establishing data connections or receiving external memory devices, such as a USB or FireWire® connector sockets, or other network connection circuits (e.g., interfaces) for coupling the processor 811 to a network. In a notebook configuration, the computer housing may include the touchpad 817, the keyboard 818, and the display 819 all coupled to the processor 811. Other configurations of the computing device may include a computer mouse or trackball coupled to the processor (e.g., via a USB input) as are well known, which may also be used in conjunction with the various embodiments.

Figure 9:
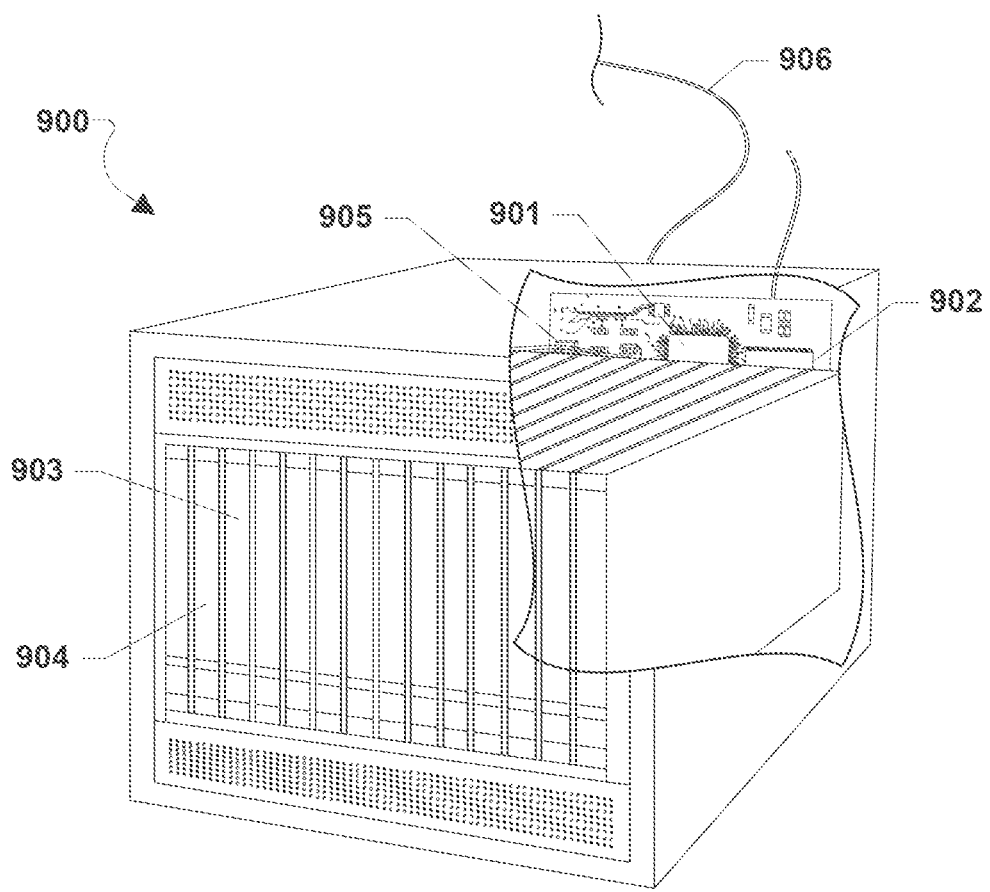
FIG. 9 is a component diagram of an example server suitable for use with the various embodiments.

Various embodiments (including, but not limited to, embodiments discussed above with reference to FIGS. 1-7) may be implemented on any of a variety of commercially available server devices, such as the server device 900 illustrated in FIG. 9. Such a server device 900 may include a processor 901 coupled to volatile memory 902 and a large capacity nonvolatile memory, such as a disk drive 903. The server device 900 may also include a floppy disc drive, compact disc (CD) or DVD disc drive 904 coupled to the processor 901. The server device 900 may also include network access ports 906 coupled to the processor 901 for establishing data connections with a network connection circuit 905 and a communication network (e.g., IP network) coupled to other communication system network elements.

The processors 811, 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 811, 901. The processors 811, 901 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 811, 901 including internal memory or removable memory plugged into the device and memory within the processors 811, 901 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for augmenting network operator ad inventory in a Video-On-Demand (VOD) session provided as a VOD stream to a customer computing device via a cable modem termination system (CMTS), comprising:
   determining, by an ad router server, whether an ad response message from a programmer server indicates any unused programmer ad inventory is available for the VOD session and a rules response message for the VOD session includes an indication that an ad inventory rule allows for transfer of unused ad inventory, wherein the unused programmer ad inventory is one or more ad placement opportunities in the VOD session not filled with an ad selected by the programmer server after an opportunity to do so;
   generating, by the ad router server, a Video Ad Serving Template (VAST) request to a network operator server in response to the ad response message from the programmer server indicating unused programmer ad inventory is available for the VOD session and the rules response message for the VOD session including the indication that the ad inventory rule allows for transfer of unused ad inventory, wherein the VAST request indicates both pre-assigned network operator ad inventory and the unused programmer ad inventory;
   sending, from the ad router server, the VAST request to the network operator server;
   receiving, at the ad router server, a VAST response from the network operator server, wherein the VAST response from the network operator server indicates at least one ad identifier assigned to the unused programmer ad inventory; and
   sending, by the ad router server, an ad list for the VOD session to a VOD server in communication with the CMTS providing the VOD stream to the customer computing device, the ad list for the VOD session including the at least one ad identifier assigned to the unused programmer ad inventory.

2. The method of claim 1, further comprising:
   receiving, at the ad router server, the rules response message for the VOD session from a server of the network operator;
   generating, by the ad router server, a VAST request to the programmer server in response to receiving the rules response message for the VOD session;
   sending, from the ad router, the VAST request to the programmer server.

3. The method of claim 2, wherein the VAST request to the network operator server is generated based at least in part on the rules response message for the VOD session from the server of the network operator.

4. The method of claim 1, further comprising:
   generating, by the ad router server, one or more ad metrics based on the ad list; and
   sending, from the ad router server, the ad metrics to a server of the network operator.

5. The method of claim 1, further comprising:
   determining, by the ad router server, whether the VAST response from the network operator server indicates any unused network operator ad inventory is available for the VOD session;
   generating, by the ad router server, an VAST request to the programmer server in response to the VAST response from the network operator server indicating unused network operator ad inventory is available for the VOD session, wherein the VAST request indicates the unused network operator ad inventory; and
   sending, from the ad router server, the VAST request to the programmer server.

6. An ad router server, comprising:
   a processor configured with processor-executable instructions to perform operations comprising:
      determining whether an ad response message from a programmer server indicates any unused programmer ad inventory is available for a Video-On-Demand (VOD) session provided as a VOD stream to a customer computing device via a cable modem termination system (CMTS) and a rules response message for the VOD session includes an indication that an ad inventory rule allows for transfer of unused ad inventory, wherein the unused programmer ad inventory is one or more ad placement opportunities in the VOD session not filled with an ad selected by the programmer server after an opportunity to do so;
      generating a Video Ad Serving Template (VAST) request to a network operator server in response to the ad response message from the programmer server indicating unused programmer ad inventory is available for the VOD session, wherein the VAST request indicates both pre-assigned network operator ad inventory and the unused programmer ad inventory;

sending the VAST request to the network operator server;

receiving a VAST response from the network operator server, wherein the VAST response from the network operator server indicates at least one ad identifier assigned to the unused programmer ad inventory; and sending an ad list for the VOD session to a VOD server in communication with the CMTS providing the VOD stream to the customer computing device, the ad list for the VOD session including the at least one ad identifier assigned to the unused programmer ad inventory.

7. The server of claim 6, wherein the processor is configured with processor-executable instructions to perform operations further comprising:

receiving the rules response message for the VOD session from a server of the network operator;

generating a VAST request to the programmer server in response to receiving the rules response message for the VOD session;

sending the VAST request to the programmer server.

8. The server of claim 7, wherein the processor is configured with processor-executable instructions to perform operations such that the VAST request to the network operator server is generated based at least in part on the rules response message for the VOD session from the server of the network operator.

9. The server of claim 6, wherein the processor is configured with processor-executable instructions to perform operations further comprising:

generating one or more ad metrics based on the ad list; and sending the ad metrics to a server of the network operator.

10. The server of claim 6, wherein the processor is configured with processor-executable instructions to perform operations further comprising:

determining whether the VAST response from the network operator server indicates any unused network operator ad inventory is available for the VOD session;

generating an VAST request to the programmer server in response to the VAST response from the network operator server indicating unused network operator ad inventory is available for the VOD session, wherein the VAST request indicates the unused network operator ad inventory; and sending the VAST request to the programmer server.

11. A non-transitory processor readable medium having stored thereon processor-executable instructions configured to cause a processor of an ad router server to perform operations comprising:

determining whether an ad response message from a programmer server indicates any unused programmer ad inventory is available for a Video-On-Demand (VOD) session provided as a VOD stream to a customer computing device via a cable modem termination system (CMTS) and a rules response message for the VOD session includes an indication that an ad inventory rule allows for transfer of unused ad inventory, wherein the unused programmer ad inventory is one or more ad placement opportunities in the VOD session not filled with an ad selected by the programmer server after an opportunity to do so;

generating a Video Ad Serving Template (VAST) request to a network operator server in response to the ad response message from the programmer server indicating unused programmer ad inventory is available for the VOD session, wherein the VAST request indicates both pre-assigned network operator ad inventory and the unused programmer ad inventory;

sending the VAST request to the network operator server;

receiving a VAST response from the network operator server, wherein the VAST response from the network operator server indicates at least one ad identifier assigned to the unused programmer ad inventory; and sending an ad list for the VOD session to a VOD server in communication with the CMTS providing the VOD stream to the customer computing device, the ad list for the VOD session including the at least one ad identifier assigned to the unused programmer ad inventory.

12. The non-transitory processor readable medium of claim 11, wherein the stored processor-executable instructions are configured to cause a processor of an ad router server to perform operations further comprising:

receiving the rules response message for the VOD session from a server of the network operator;

generating a VAST request to the programmer server in response to receiving the rules response message for the VOD session;

sending the VAST request to the programmer server.

13. The non-transitory processor readable medium of claim 12, wherein the stored processor-executable instructions are configured to cause a processor of an ad router server to perform operations such that the VAST request to the network operator server is generated based at least in part on the rules response message for the VOD session from the server of the network operator.

14. The non-transitory processor readable medium of claim 11, wherein the stored processor-executable instructions are configured to cause a processor of an ad router server to perform operations further comprising:

generating one or more ad metrics based on the ad list; and sending the ad metrics to a server of the network operator.

15. The non-transitory processor readable medium of claim 11, wherein the stored processor-executable instructions are configured to cause a processor of an ad router server to perform operations further comprising:

determining whether the VAST response from the network operator server indicates any unused network operator ad inventory is available for the VOD session;

generating an VAST request to the programmer server in response to the VAST response from the network operator server indicating unused network operator ad inventory is available for the VOD session, wherein the VAST request indicates the unused network operator ad inventory; and sending the VAST request to the programmer server.

* * * * *